Dec. 31, 1957     A. L. CATALINE     2,818,270
WHEEL ADJUSTMENT FOR LAWN MOWERS
Filed Feb. 27, 1956     2 Sheets-Sheet 1

INVENTOR.
ACIAL L. CATALINE
BY
ATTORNEYS.

Dec. 31, 1957 A. L. CATALINE 2,818,270
WHEEL ADJUSTMENT FOR LAWN MOWERS
Filed Feb. 27, 1956 2 Sheets-Sheet 2
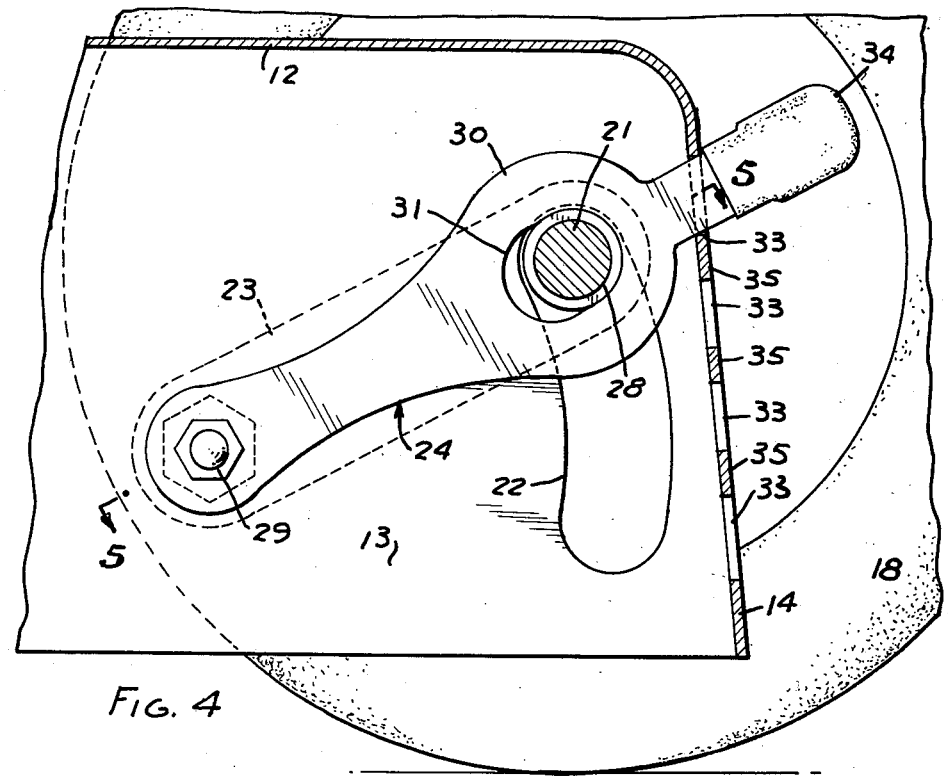
FIG. 4
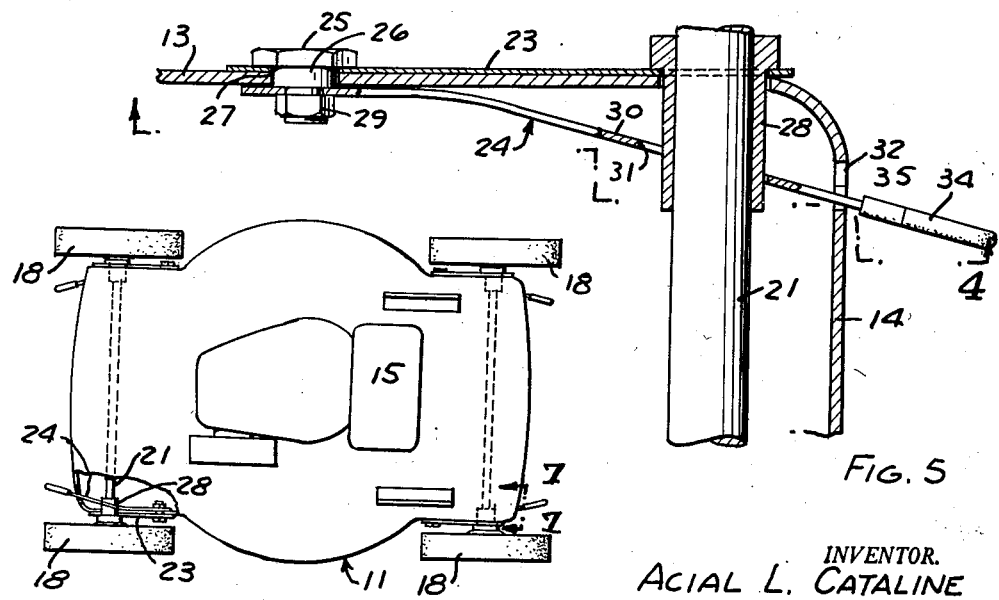
FIG. 5
FIG. 6
INVENTOR.
ACIAL L. CATALINE
BY
Barnes, Kisselle, Laughlin & Raisch
ATTORNEYS.

United States Patent Office 2,818,270
Patented Dec. 31, 1957

2,818,270

WHEEL ADJUSTMENT FOR LAWN MOWERS

Acial L. Cataline, Lansing, Mich., assignor to Motor Wheel Corporation, Lansing, Mich., a corporation of Michigan Application February 27, 1956, Serial No. 567,764

7 Claims. (Cl. 280—44)

This invention relates to lawn mowers and particularly to a mechanism for adjusting the position of the wheels on a rotary lawn mower.

In rotary lawn mowers, a cutting blade is mounted for rotation about a vertical axis in the lawn mower frame or housing. In one type of rotary lawn mower, the position of the rotary cutting blade relative to the ground is adjusted by changing the vertical position of the wheels relative to the housing of the lawn mower.

It is an object of this invention to provide a mechanism for vertically adjusting the position of the wheels relative to the housing wherein the adjustment may be made quickly and without the use of tools.

It is a further object of this invention to provide such a wheel adjusting mechanism wherein the adjustment may be made at any time and even when the lawn mower is being operated.

It is a further object of this invention to provide such a mechanism which is economical to construct.

It is a further object of this invention to provide such a mechanism which permits easy adjustment of the wheels and yet is sufficiently strong to support the weight of the lawn mower.

In the drawings:

Fig. 4 is a sectional elevational view of the wheel adjusting mechanism on a greatly enlarged scale taken along the line 4—4 in Fig. 5.

Fig. 5 is a sectional view taken along the line 5—5 in Fig. 4.

Fig. 6 is a plan view of the lawn mower, parts being broken away.

Figure 1:
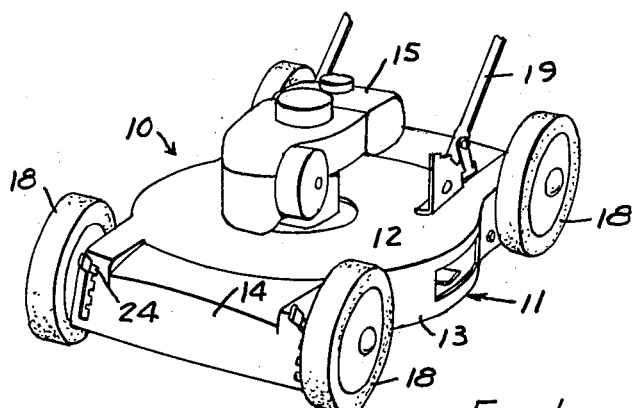
Fig. 1 is a fragmentary perspective view of a lawn mower embodying the invention.
Figure 3:
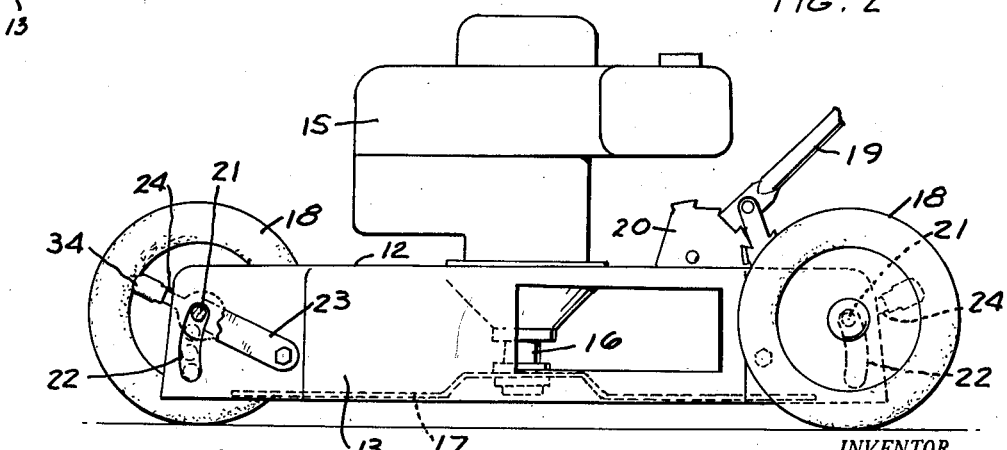
Fig. 3 is a side elevational view of the same, parts being broken away.

Referring to Fig. 1, a lawn mower 10 comprises a housing 11 which includes a top wall 12, downwardly extending peripheral side walls 13 and downwardly extending peripheral end walls 14. A power unit 15 is mounted on top wall 12 of housing 11 and drives a vertical shaft 16 on the lower end of which is mounted a rotary blade 17 (Fig. 3). Wheels 18 are mounted on the housing for supporting the housing for movement along the ground. A handle 19 is pivoted to brackets 20 on top wall 12 of the housing for guiding the lawn mower in its movement along the ground.

According to the invention, a wheel adjusting mechanism is provided for each of the wheels. Referring to Figs. 3 and 4, wheels 18 at each end of housing 11 are mounted on the ends of axle 21 which extends transversely through the peripheral side walls 13 of the housing. Side walls 13 are provided with arcuate vertically extending slots 22 which permit axle 21 to be moved vertically relative to housing 11.

As shown in Figs. 5 and 6, axle 21 is supported by a pair of arms 23, 24 which are pivoted to the peripheral side wall 13 of the housing by means of a bolt 25. Bolt 25 extends through the side wall 13 and includes a centrally enlarged portion 26 which bears against an opening 27 in side wall 13. Arm 23 is positioned on the outside surface of wall 13 and is generally straight and of substantially uniform width. A bushing 28 is press fitted in the end of arm 23, and axle 21 extends through the bushing 28. Arm 24 is mounted on bolt 25 along the inner surface of the side wall 13. Arms 23, 24 are maintained in position by a nut 29 threaded on the end of bolt 25.

The inner arm 24 is made of a material having spring characteristics. Spring arm 24 extends along the inner surface of wall 13 for a short distance and then bends inwardly so that the free end thereof extends through the peripheral end wall 14 of the lawn mower housing. As shown in Fig. 4, spring arm 24 has an enlarged central portion 30 with an oval or elongated opening 31 which opening has a greater dimension along the axis of the arm than transversely thereto. The bushing 28 which supports the axle 21 is of sufficient length that it extends through the opening 31 in the spring arm 24. The width of the opening 31 and the arcuate slot 22 in the side wall 13 are substantially equal to the diameter of the bushing 28.

Figure 7:
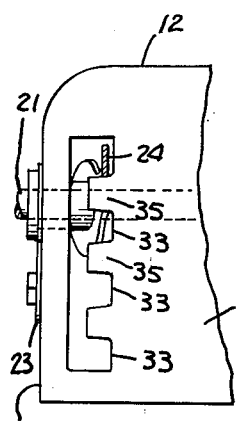
Fig. 7 is a sectional view taken along the line 7—7 in Fig. 6, on an enlarged scale.
Figure 2:
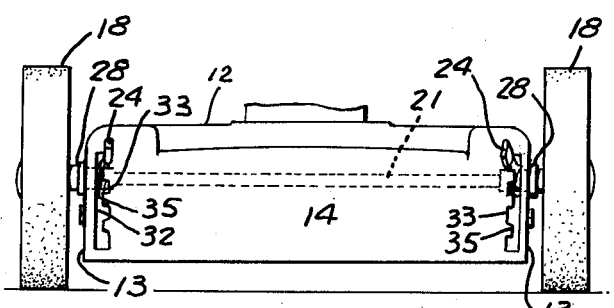
Fig. 2 is a front elevational view with the engine removed.

As shown in Figs. 2, 4 and 7, the free end of spring arm 24 extends outwardly through the peripheral end wall 14 through a vertical slot 32. Slot 32 is formed with vertically spaced notches 33 separated by teeth 35 along the edge thereof nearest the center of the housing. The height of these notches is slightly greater than the width of spring arm 24 in the area which is adjacent to the notches so that the spring arm will, due to its spring characteristics, tend to move into the notches. A plastic or rubber sleeve 34 may be applied to the free end of spring arm 24 to provide a handle for gripping the end of arm 24.

By the above construction, the position of the end of axle 21 is determined by the angular position of spring arm 24. The position of the axle and, in turn, of the wheels relative to the housing may be changed by grasping handle 34 and applying a force thereto in a direction outwardly relative to the housing thereby moving the spring arm out of engagement with one of the notches 33. The spring arm may thereafter be moved upwardly or downwardly to the desired position and, upon being released, the end thereof will move inwardly relative to the housing and the portion thereof adjacent one of the notches will engage one of the notches and lock the axle in the newly adjusted position.

A similar structure is applied on each end of the axles so that, in the lawn mower shown, four wheel height adjusting mechanisms are provided.

It can thus be seen that I have provided a novel structure for adjusting the position of the wheels relative to the housing of a lawn mower and thereby adjusting the height of the grass which is being cut. This adjustment may be made quickly and without the use of tools. Moreover, the adjustment may be made at any time, even when the rotary blade of the lawn mower is being rotated. Each of the wheels is adjustable independently, but at the same time the construction permits the use of a single axle for each pair of wheels which insures a sufficiently strong construction to support the weight of a lawn mower. Each axle is supported by a pair of levers at each end thereof.

The supporting arms may be made of sheet metal and the particular configuration of the spring arm insures that the proper spring action is obtained.

I claim:

1. In a lawn mower, the combination comprising a housing having a top wall, side walls and end walls projecting downwardly from said top wall, said side walls adjacent one end wall of the housing being formed with vertical slots, an axle extending through said slots and transversely of said housing, a wheel mounted on each end of said axle, a pair of arms pivoted to each side wall of said housing, said arms being formed with bearing openings through which said axle projects, the opening in one said arm of each pair through which the axle projects having a greater dimension in a direction along the length of said arm, said end wall of the housing being formed with a vertical slot adjacent each side wall through which a portion of one arm of each pair of arms projects, and means on said end wall for interengaging said portions of said arms thereby maintaining said arms in a plurality of angularly adjusted positions.

2. In a lawn mower, the combination comprising a housing having a top wall, side walls and end walls projecting downwardly from said top wall, said side walls adjacent one end wall of the housing being formed with vertical slots, an axle extending through said slots and transversely of said housing, a wheel mounted on each end of said axle, a pair of arms pivoted to each side wall of said housing, said arms being formed with bearing openings through which said axle projects, one said arm being provided with a bushing in the opening thereof, said bushing surrounding the axle, the opening in said arm through which the axle projects having a width substantially equal to the diameter of said bushing and a length greater than the diameter of said bushing, said end wall of the housing being formed with a vertical slot adjacent each side wall through which a portion of one arm of each pair of arms projects, and means on said end wall for interengaging said portions of said arms thereby maintaining said arms in a plurality of angularly adjusted positions.

3. In a lawn mower, the combination comprising a housing having a top wall, side walls and end walls projecting downwardly from said top wall, said side walls adjacent one end wall of the housing being formed with vertical slots, an axle extending through said slots and transversely of said housing, a wheel mounted on each end of said axle, a pair of arms pivoted to each side wall of said housing, said arms being formed with bearing openings through which said axle projects, said end wall of the housing being formed with a vertical slot adjacent each side wall through which a portion of one arm of each pair of arms projects, and means on said end wall for interengaging said portions of said arms thereby maintaining said arms in a plurality of angularly adjusted positions, said one arm of each pair of arms which projects through said vertical slot being made of a material having spring like characteristics whereby the arm has limited bending movement about its pivotal point to said side wall in a direction transversely of said housing, said means on said housing for interengaging said arms comprising a multiplicity of vertically spaced notches along an edge of each said vertical slot in the end wall of said housing and adapted to be engaged by said arm having spring like characteristics, said opening in the arm having the spring like characteristics having a length greater than the diameter of said axle.

4. In a lawn mower, the combination comprising a housing having a top wall, side walls and end walls projecting downwardly from said top wall, said side walls adjacent one end wall of the housing being formed with vertical slots, an axle extending through said slots and transversely of said housing, a wheel mounted on each end of said axle, a first arm adjacent the outer surface of each side wall and a second arm adjacent the inner surface of each side wall, said arms being mounted on their respective side wall for pivotal movement about a common horizontal axis, said arms being provided with openings therethrough through which said axle projects, each said first arm being provided with a bushing in the opening therein surrounding the axle, the opening in each said second arm through which the axle projects having a width substantially equal to the diameter of said bushing and a length greater than the diameter of said bushing, said end wall of the housing being formed with a vertical slot individual to each said second arm and through which the end of each said second arm projects, and means on said housing for interengaging said arms in a plurality of angularly adjusted positions.

5. In a lawn mower, the combination comprising a housing having a top wall, side walls and end walls projecting downwardly from said top wall, said side walls being substantially flat adjacent one end wall of the housing and having arcuate vertically extending slots in said substantially flat portions, an axle extending transversely of said housing through said slots, a wheel mounted on each end of said axle, a pair of arms mounted on each substantially flat portion of the side wall for pivotal movement about a common horizontal axis, the center of the radius of curvature of each said arcuate slot lying on the horizontal axis about which each of said arms is pivoted, one of each said pair of arms being positioned adjacent the outer surface of said side wall and the other of each said pair of arms being positioned adjacent the inner surface of said side wall, said arm adjacent the outer surface being substantially flat and extending along the surface of said side wall, the other said arm extending generally diagonally away from said side wall, said arms being formed with openings therethrough through which said axle projects, said arm adjacent the outer surface of each said side wall being provided with a bushing in the opening thereof surrounding the axle, said bushing being of sufficient length to extend through said opening in said arm adjacent the inner surface of said side wall, said opening in said arm adjacent the inner surface of said side wall having a width substantially equal to the diameter of said bushing and a length greater than the diameter of said bushing, said peripheral end wall of the housing being formed with a vertical slot individual to each said inner arm through which the end of said inner arm projects, and means on said housing for interengaging said inner arms in a plurality of angularly adjusted positions.

6. In a lawn mower, the combination comprising a housing having a top wall, side walls and end walls projecting downwardly from said top wall, said side walls adjacent one end wall of the housing being formed with vertical slots, an axle extending through said slots and transversely of said housing, a wheel mounted on each end of said axle, an arm pivoted to each side wall of said housing, each said arm being formed with a bearing opening through which the axle projects, the opening in said arm having a greater dimension in a direction along the length of said arm, said end wall of the housing being formed with a vertical slot adjacent each side wall through which a portion of each arm projects, and means on said end wall for interengaging said portions of said arms thereby maintaining said arms in a plurality of angularly adjusted positions.

7. The combination set forth in claim 6 wherein each said arm is made of a material having spring like characteristics whereby the arm has limited bending movement about its pivotal point to said side wall in a direction transversely of said housing, said means on said housing for interengaging said arms comprising a multiplicity of vertically spaced notches along an edge of each said vertical slot in the end wall of said housing and adapted to be engaged by said arm.

References Cited in the file of this patent

UNITED STATES PATENTS

| 2,563,919 | Christensen | Aug. 14, 1951 |
| 2,722,432 | Roberton | Nov. 1, 1955 |
| 2,728,582 | Knarzler | Dec. 27, 1955 |

FOREIGN PATENTS

| 540,771 | Great Britain | Oct. 29, 1941 |